(12) United States Patent
Skowronski et al.

(10) Patent No.: US 11,436,099 B2
(45) Date of Patent: Sep. 6, 2022

(54) BACKUP CLIENT AGENT

(71) Applicant: EMC IP Holding Company LLC, Hopkinton, MA (US)

(72) Inventors: Andrew Skowronski, Hudson (CA); Joseph Cline, Orem, UT (US); Jian Li, NingBo (CN); Russell Budd Simons, Herriman, UT (US); Zhaoding Wu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 206 days.

(21) Appl. No.: 16/528,323

(22) Filed: Jul. 31, 2019

(65) Prior Publication Data

US 2020/0026620 A1 Jan. 23, 2020

Related U.S. Application Data

(63) Continuation of application No. 14/984,163, filed on Dec. 30, 2015, now Pat. No. 10,430,293.

(51) Int. Cl.
*G06F 16/00* (2019.01)
*G06F 11/14* (2006.01)

(52) U.S. Cl.
CPC ...... *G06F 11/1469* (2013.01); *G06F 11/1448* (2013.01); *G06F 2201/86* (2013.01)

(58) Field of Classification Search
CPC ............. G06F 11/1469; G06F 11/1448; G06F 2201/86
See application file for complete search history.

(56) References Cited

U.S. PATENT DOCUMENTS

| | | | |
|---|---|---|---|
| 7,146,387 B1 | 12/2006 | Russo et al. | |
| 7,315,807 B1 | 1/2008 | Lavallee | |
| 10,305,962 B1 | 5/2019 | Skowronski | |
| 2004/0260973 A1 | 12/2004 | Michelman | |
| 2005/0021276 A1 | 1/2005 | Southam | |
| 2005/0038836 A1 | 2/2005 | Wang | |
| 2005/0228994 A1* | 10/2005 | Kasai | G06F 21/40 713/168 |
| 2011/0276823 A1 | 11/2011 | Ueno et al. | |
| 2012/0310889 A1 | 12/2012 | Mcneil et al. | |
| 2013/0145351 A1 | 6/2013 | Tunik | |

(Continued)

OTHER PUBLICATIONS

U.S. Appl. No. 14/983,966, filed Dec. 30, 2015, Andrew Skowronski.

(Continued)

*Primary Examiner* — Hung Q Pham
(74) *Attorney, Agent, or Firm* — Workman Nydegger

(57) ABSTRACT

In one example, a method includes receiving, by a cloud service, a register call for authorization to access one or more other cloud services, and the register call is received from a backup client agent and includes a registration code, and registering, by the cloud service, the backup client agent. The cloud services implements an authentication process that includes evaluating the registration code, and when the backup client agent is not authenticated, access by the backup client agent to one or more of the other cloud services is prevented, and when the backup client agent is authenticated, a token is transmitted to the backup client agent.

20 Claims, 7 Drawing Sheets

(56) References Cited

U.S. PATENT DOCUMENTS

2013/0275695 A1\* 10/2013 Ponsford ............ G06F 11/1456
711/162
2014/0149358 A1 5/2014 Aphale
2014/0359581 A1 12/2014 Soshin
2016/0119209 A1 4/2016 Rosengarten

OTHER PUBLICATIONS

U.S. Appl. No. 14/983,966, filed Aug. 23, 2017, Office Action.
U.S. Appl. No. 14/983,966, filed Feb. 23, 2018, Final Office Action.
U.S. Appl. No. 14/984,163, filed Jan. 31, 2018, Restriction Requirement.
U.S. Appl. No. 14/984,163, filed May 11, 2018, Office Action.
U.S. Appl. No. 14/983,966, filed Jun. 18, 2018, Office Action.
U.S. Appl. No. 14/984,163, filed Oct. 12, 2018, Final Office Action.
U.S. Appl. No. 14/984,163, filed Jan. 18, 2019, Office Action.
U.S. Appl. No. 14/983,966, filed Feb. 1, 2019, Notice of Allowance.
U.S. Appl. No. 14/984,163, filed Jun. 6, 2019, Notice of Allowance.

\* cited by examiner

BACKUP CLIENT AGENT

RELATED APPLICATIONS

This application is related to: U.S. Pat. No. 10,305,962 (Ser. No. 14/983,966), entitled UNIT TESTING CLIENTS OF WEB SERVICES, and filed Dec. 30, 2015; and, U.S. patent application Ser. No. 16/528,368, entitled BACKUP CLIENT AGENT, and filed the same day herewith.

This application is a continuation of, and hereby claims priority to, U.S. patent application Ser. No. 14/984,163, entitled BACKUP CLIENT AGENT, and filed Dec. 30, 2015.

All of the aforementioned applications are incorporated herein in their respective entireties by this reference.

FIELD OF THE INVENTION

Embodiments of the present invention generally concern data backup and restoration. More particularly, at least some embodiments of the invention relate to systems, hardware, computer-readable media, and methods directed to the implementation and use of a backup client agent.

BACKGROUND

Entities often generate and use data that is important in some way to their operations. This data can include, for example, business data, financial data, and personnel data. If this data were lost or compromised, the entity may realize significant adverse financial and other consequences. Accordingly, many entities have chosen to back up some or all of their data so that in the event of a natural disaster, unauthorized access, or other events, the entity can recover any data that was lost or compromised, and then restore that data to one or more locations, machines and/or environments.

In order to implement a backup of data, such as client data for example, a backup application on a backup server may cooperate with a backup client, or backup client agent, located on the client. The backup is created at the client and then uploaded to a storage node. If a problem occurs, such as loss of data from the client, the data in the backup can be retrieved from the storage node and restored to the client. While this general approach has proved useful, some problems and shortcomings have arisen, particularly pertaining to the backup client.

For example, some backup clients are required to perform a significant amount of processing on data before that data can be backed up and stored at a storage node. This processing can increase the overall processing overhead on the client, and can negatively impact other client operations.

As another example, some backup clients are configured so that they must be controlled locally, or on-premises, in order that a backup can be defined and performed. While this approach is acceptable in small enterprises and single client systems, it becomes problematic in large enterprises with multiple clients, since administrators have to configure and control the clients locally at each client.

In light of problems such as those noted above, and others in the art, it would be useful to provide systems, methods and devices that reduce the processing overhead of a backup client. As well, it would also be useful to enable backup processes performed by a client to be centrally configured and controlled from a remote location. It would also be useful to provide each client with a unique ID so that the configuration, state and statistics of each backup client could be tracked and collected. Finally, it would be useful to provide a backup client agent operable to interact with a suite of cloud based services that relate to backup operations.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
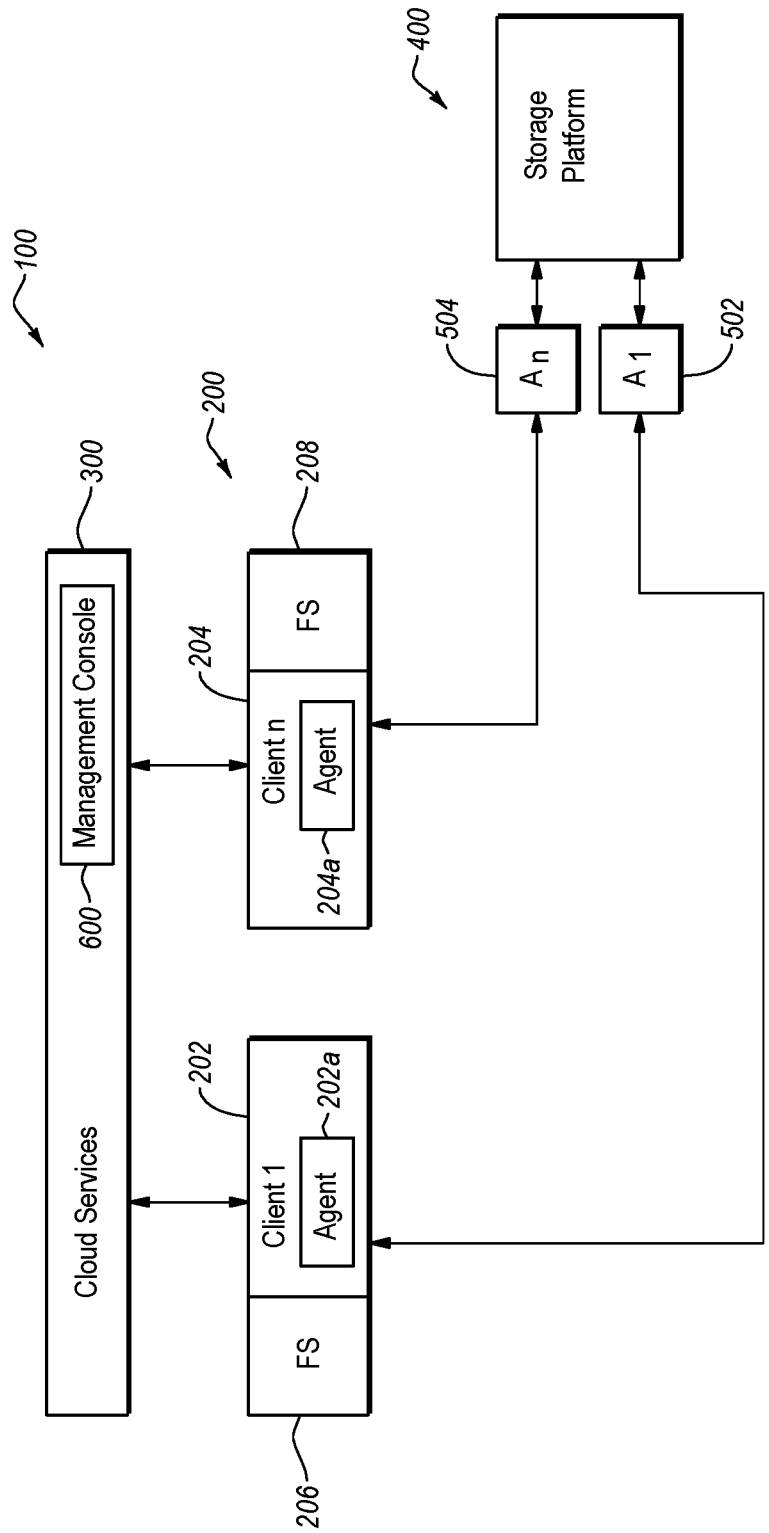
FIG. 1 is directed to aspects of an example operating environment for at least some embodiments.

Embodiments of the present invention generally concern systems, hardware, computer-readable media, and methods directed to the implementation and use of a backup client agent operable to facilitate and implement client data backups and related processes. Embodiments of the invention can be employed, for example, in connection with a variety of cloud services and a cloud storage environment, but the scope of the invention is not limited to such services and environments.

Embodiments of the invention can be employed in connection with any type of data. As used herein, the term 'data' is intended to be construed broadly and includes, by way of example and not limitation, data blocks, atomic data, chunks, segments, emails, objects, files, blocks, file structures, directories, volumes, and any group of one or more of the foregoing. The data can be of any type, and the scope of the invention is not limited to any particular type, or types, of data.

As well, it should be understood that the term 'backup,' as used herein, is intended to be broadly construed and is not limited to any particular type or form of backup. Thus, backup, as contemplated by this disclosure, embraces, but is not limited to, full backups, snapshots, incremental backups, de-duplicated backups, and any other circumstance or process where data that is desired to be protected is copied to one or more backup resources for protection.

In at least some embodiments, respective instances of a backup client agent reside at each of a plurality of clients, such as in an enterprise network environment. The backup client agent includes a group of client libraries by way of which the backup client agent makes calls to a variety of services, which can be cloud-based services, relating to backups and backup processes. Such services may include, for example, an authorization service, a command and control service, a configuration service, and a restore service.

By interacting with the various services, the backup client agent is able to generate and execute backup jobs and restore jobs relating to data residing at the client, or data that is to be restored to the client. In at least some embodiments, the data targeted for backup can be processed to some extent at the client before being transmitted. Such processing may include file processing such as variable block encoding and patching. The data to be backed up may originate from a local file system, although that is not necessarily required.

When the processing of the backup data has been completed, the backup client agent can transmit the backup to an appliance which may serve as a cloud storage gateway, that is, the appliance operates to abstract the cloud storage. In some embodiments, each backup client agent is associated with a respective dedicated appliance. The appliance may take the form of a file server for example and can be located in a variety of locations, such as on-premises with the system on which the backup client agent resides, or the applicant can be part of a cloud computing system. The appliance may have an associated native agent that resides within the backup client agent and coordinates operations between the backup client agent and the appliance.

In terms of its operation and functionality, the appliance can cooperate with the client to perform compression and/or deduplication processes and then push the processed data, that is, the backup, to a cloud storage node. For example, the compression and deduplication can take place via communication between the client and the appliance to determine exactly what data needs to be sent from the client to the appliance. That means that the client may not send the entire backup data to the appliance if it is determined via client side and server side processing that the data is not needed. In any event, if desired, the appliance can be configured to include only information necessary to functions such as those noted above.

Thus, in some example embodiments, the appliance may omit the information that is needed to perform a restore process, and/or the appliance may not provide information such as backup status.

Finally, the backup client agent may be one of a group of backup client agents that is centrally controlled. The central control of the backup client agent(s) can be implemented by way of a management console that may take the form of a cloud computing entity that communicates with one or more clients, the services, and the appliance.

A. Example Operating Environments

In general, embodiments of the invention may include and/or be implemented in an operating environment that includes various clients and/or other devices that generate and/or cause the generation of data that is desired to be backed up and subsequently restored. Before addressing specific examples disclosed in the figures, some general considerations are provided below. These considerations are provided only by way of example and are not necessarily required in any particular embodiment and are not intended to limit the scope of the invention in any way.

For example, in at least some embodiments involving manual backups, each manual backup is for a single backup policy rather than for all backup policies As well, automatic triggering of regular manual backups, rather than performance of a continuous backup process, can be employed in some embodiments. Moreover, some embodiments provide that only a single backup or restore will be performed. One advantage of this approach is the simplification of the main processing logic. It should be noted that the foregoing are provided only by way of example and are not necessarily required in any particular embodiment.

It should be noted that the term "saveset" used herein refers to the data created during the execution of a single backup, where the single backup refers to a single backup policy. The ID of the saveset acts as a unique version identifier and all files saved in the saveset will have the same saveset ID. As well, multiple appliances can be used from a single client, and such appliances may be referred to herein as "targets." Each backup policy may refer to a single "target" and, as such, each such backup will write to only a single appliance.

As discussed in more detail below, the file version written to an appliance and a catalog will reference the "SaveSet ID" of the particular backup that created the version. Information about the SaveSet will be recorded in the catalog. In some embodiments at least, a SaveSet always refers to one single backup policy and one single target appliance. The backups can be incremental, in which case the saveset only describes new changes since the last backup, that is, new versions or deletions. When a backup is performed, the backup creates a new "saveset" in the catalog. A saveset records all the file system data that is backed up by a particular backup operation. It should also be noted that the saveset refers to a specific backup policy, and the backup policy defines what data on the machine to backup and which appliance to backup the files to.

With the foregoing in mind, attention is directed now to FIG. 1 which discloses one example of an operating environment that may be suitable for one or more embodiments of the invention. In FIG. 1, the example operating environment is denoted at 100 and may be a network such as a local area network, a wide area network, the Internet, or any other networked configuration. Moreover, the operating environment 100, or any group of one or more of its elements, may comprise, form an element of, or constitute, a cloud computing environment. The operating environment 100 may include various devices including servers and other computers that are interconnected. The operating environment 100 may employ a variety of communication media, such as hardwire, wireless, or some combination thereof. In some instances, some or all of the operating environment 100 may comprise an optical communication network.

As indicated in FIG. 1, the example operating environment 100 includes a plurality of clients 200, such as clients 202 (client 1) and 204 (client 'n'), that each communicate with a suite of cloud services 300, discussed in further detail elsewhere herein. There can be any number 'n' of clients 200 in the operating environment 100. One or more of the clients 202 and 204 include a respective backup client agent 202a and 204a. Each of the backup client agents 202a and 204a may have a respective unique identification (ID). As well, the clients 202 and 204 may be associated with one or more respective filesystem, such as filesystems 206 and 208, for example. In general, the filesystems 206 and 208 may include data that is desired to be backed up.

To that end, the example operating environment 100 also includes one or more storage platforms 400. One or more of the storage platforms 400 can take the form of a cloud storage platform, although that is not necessarily required. One example of such a cloud storage platform is the Amazon Simple Storage Service (Amazon S3) platform, although any other cloud storage platform could be employed. Other example platforms include OpenStack Swift, EMC Corp. Atmos, Centera CAS, and Hadoop HDFS.

With particular reference now to the storage platform 400, such a storage node can include, or at least access, physical storage in the form of one or more physical storage nodes. One example of such a physical storage node is the Infinity physical commodity box produced by EMC Corp., although any other physical storage node(s) could alternatively be employed. The physical storage may comprise an element of a distributed filesystem platform, such as an EMC Corp. Elastic Cloud Storage (ECS), Amazon S3, or other storage cluster, although no particular form of implementation of the physical storage, or its constituent components, is required.

As further indicated in FIG. 1, and discussed in more detail elsewhere herein, the example operating environment 100 may include one or more appliances 502 and 504, which can each serve a respective client, such as clients 202 and 204. Among other things, the appliances 502 and 504 may serve to abstract the storage platform 400 for the clients 202 and 204. In more detail, the appliances 502 and 504 cooperate with the backup client agents 202a and 204a, respectively, to back up client data to the storage platform 400, and also to restore data from the storage platform 400 to the clients 202 and 204. When a client is identified to which data is to be restored, that client may be referred to as a target or target device.

In some particular embodiments, one or more of the appliances 502 and 504 can take the form of the filer cloud storage gateway, Maginatics Virtual Filer (or MVF), produced by Maginatics. The MVF may also sometimes be referred to as EMC Cloud Boost. In such embodiments, the software for the appliance can be located on a user premises, in a co-location/hosting center, or the cloud. In some instances at least, up to 10 MVFs can be present in a cluster that can manage up to 14.4 petabytes (or PB) of file data. Among all MVFs, one of them can be nominated as the management console. Through the management console, a user can create, edit, delete, and monitor shares and the virtual machines (or VMs) that power them.

The Maginatics platform provides native agents (denoted generally as interface 814 in the example of FIG. 3), such as MagFS for example, for diverse operating systems (OS) that include Microsoft (MSFT) Windows, Apple (AAPL) Mac OS X, Linux, iOS, and Google (GOOGL) Android. Maginatics also supports endpoint devices, including mobile phones, tablets, laptops, servers, and virtual machines. By enabling endpoint devices to communicate directly with the cloud and MVF over their own secure connection, the Maginatics platform delivers a distributed architecture that may remove the bottlenecks associated with legacy or emerging technologies based on monolithic appliances.

It should be noted that the aforementioned discussion concerning aspects and entities of the Maginatics platform is presented solely by way of example. Thus, that discussion is not intended to limit the scope of the invention in any way. For example, some alternative embodiments use a library embedded directly in the backup agent software, without requiring the use of any native agents.

Finally, the example operating environment 100 may include a management console 600. In general, the management console 600 runs as a cloud service alongside other cloud services 300, and may communicate with those cloud services 300. As disclosed herein, actions taken by a user by way of the management console 600 can result in at least indirect communication between the management console 600 and one or more clients 200. The management console 600 can be implemented as a set of plugins that run in a generic console service. One such embodiment of the management console 600 may be referred to herein as a Client Plugin (Console).

In general, the management console 600 provides a mechanism for a user, such as an administrator, to centrally control various aspects of backups that are performed by each of a plurality of clients, such as the clients 200. In at least some embodiments, the management console 600 includes user interface (UI), such as a web browser, by way of which the user is able to configure the clients 200, as well as control the operations of the clients 200, and monitor the performance of the clients 200. Additionally, or alternatively, the management console 600 can include any other suitable type of UI or programmable interface, such as a REST API for example, as well.

With respect to the example operating environment 100, it should be noted that one, some, or all of the clients 200, cloud services 300, storage platform 400, appliances 500, and management console 600, can consist of, or comprise, a server. It is not required that the server be any particular type of server. Moreover, any of the aforementioned components may be physical machines, virtual machines (VM), combinations of physical machines and virtual machines, and/or any other suitable type of device.

B. Example Host Configuration

Figure 2:
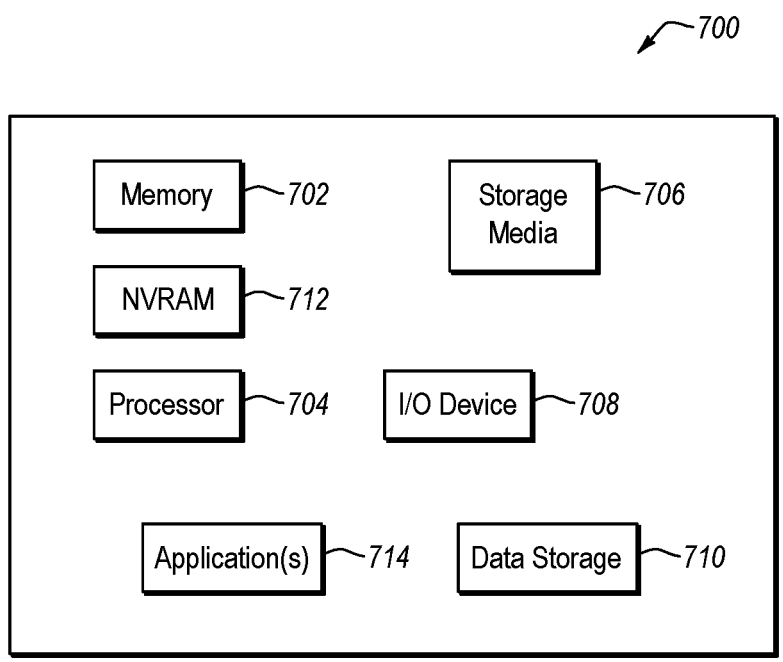
FIG. 2 is directed to an example host configuration.

With reference briefly to FIG. 2, one or more of clients 200, cloud services 300, storage platform 400, appliances 500, and management console 600 can consist of, comprise, or take the form of, one or more physical computing devices, one example of which is denoted at 700 in FIG. 2. In the example of FIG. 2, the computing device 700 includes a memory 702, one or more hardware processors 704, non-transitory storage media 706, I/O device 708, data storage 710, and NVRAM 712. As well, one or more applications 714 are provided that comprise executable instructions. Such executable instructions can take the form, for example, of any one or more of a backup application, a backup client agent, a client management application, an appliance agent, a deduplication application, and a distributed filesystem application.

C. Example Backup Client Agent Configuration

Figure 3:
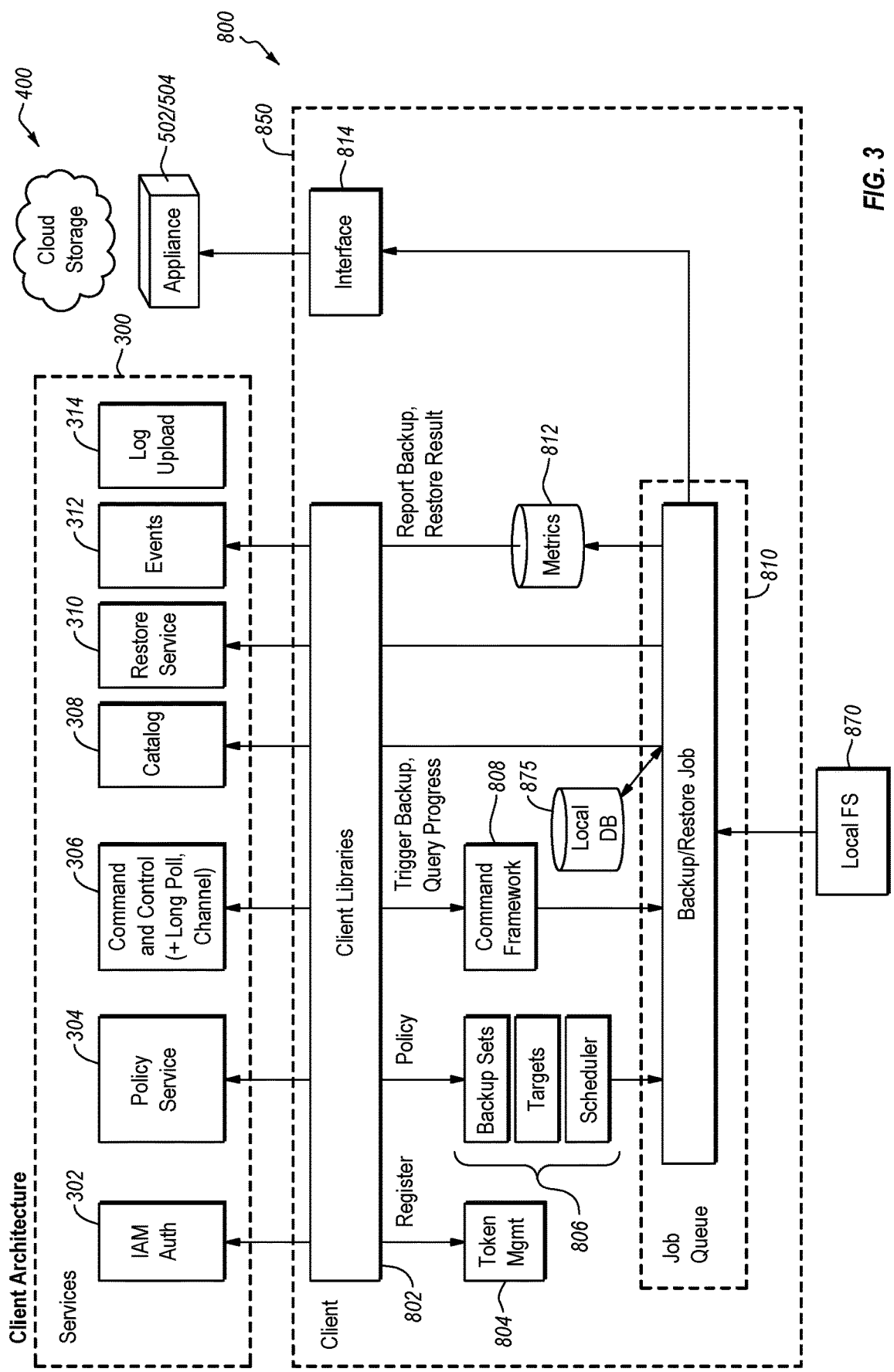
FIG. 3 is directed to an example client architecture for a backup client agent.

With reference now to FIG. 3, details are provided concerning a backup client, one example of which is denoted generally at 800. The client 800 may include, among other things, a backup client agent 850, and the backup client agent 850 can communicate with data storage at the client 800, such as a local filesystem 870 for example. Initially, some background is provided concerning various example cloud services 300 (see FIG. 1) with which the backup client agent 850 may interact. A more detailed discussion of those services is provided in the application referenced in the 'Related Applications' section of this disclosure.

One cloud service 300 with which the backup client agent 850 may interact is an Identity Access Management (IAM) authorization service 302. In general, the IAM authorization service 302 serves to authenticate the backup client agent 850 before the backup client agent 850 is allowed to make calls to the other cloud services 300. As discussed below, this process can be enabled through the use of token management.

In more detail, backup client agent 850 will use the IAM authorization service 302 to take care of registration and authentication. As used herein, registration refers to the process of recording the existence of the backup client agent 850 in a database. At registration time, the backup client agent 850 specifies which tenant it belongs to, such as by use of an invitation code for example. As long as the backup client agent 850 provides a valid registration code, the backup client agent 850 is immediately joined as a member of the tenant and optionally assigned to one or more groups.

The registration process assigns a client_id and client_secret to uniquely identify the backup client agent 850 installation, and these values are returned to the client in response to a successful register call. The client_id is used as the "AgentID" and the client_secret is needed in order to request a token. Both values are persisted, in encrypted form, in the local database of the backup client agent 850.

Another of the cloud services 300 that the backup client agent 850 can interact with is a policy service 304. In general, this policy service tracks the configuration of appliances, such as the appliances 502 and 504 (see FIG. 1).

The command and control services 306 tracks commands issued to agents and commands issued between cloud services 300. Services, may, for example, control a backup client agent such as backup client agent 850 by issuing a command or commands to that backup client agent.

A catalog 308 can be provided as part of the cloud services 300 with which the backup client agent 850 may interact. In general, the catalog 308 can take the form of a database that records all versions of files backed up by the backup client agent. The catalog 308 may include, for example, the metadata that is required to browse available backups, and to enable restoration of those backups to one or more targets. Further details concerning the implementation and use of a catalog are set forth in the following discussion.

In general, each client that is backed up will have its own "catalog," similar to the way in which a backup client agent belongs to a particular tenant, all the catalogs will belong to a specific tenant. In at least some embodiments, file content is separated from the file metadata, with the backup client agent responsible for writing to two separate services. When performing a backup, file content is written into an appliance and then the metadata describing the files is recorded in the catalog. The write process(es) can be performed in batches. For example, the backup client agent might write 100 files to the appliance and then record those 100 files in the catalog, and then repeat the process for the next 100 files, with the process continuing until the backup is finished.

Because the catalog can track metadata on directories, symbolic links, and empty files, the catalog will record a more comprehensive view of the data being backed up than what is recorded in the appliance. Deletions, empty files, directories and symbolic links are written to the catalog as part of a backup or deletion job in addition to the metadata about non-empty files that have been uploaded to the appliance. Other metadata that can be included is specific information recorded for each file, directory, saveset, location and catalog.

With regard to initialization of the catalog, each backup client agent is registered and is assigned its own unique agent ID. This agent id is used as the "catalog id," so that each backup client agent has a predictable and unique catalog. The catalog can be created "on demand" by the client before the first backup operation. The "owner" of the catalog is set to the agent ID so that only that agent or an administrator can read data from the catalog. The backup client agent also sets up a least one location object describing the specific appliance.

The catalog can be accessed both during backup operations and restore operations. For example, where a backup is being performed, a saveset structure is created, which refers both to a location and to a specific backup policy that defines what files to backup and which appliance to use. The ID of the saveset is generated by the backup client agent by incrementing the ID of the previous saveset. In the interest of efficiency, versions can be written in batches, so that a single representational state transfer application program interface (REST API) call can record many versions. At the end of the backup, the saveset is closed so that the catalog server can perform post-processing, such as calculating the expiry times for example.

As noted above, the catalog can also be accessed during a restore process. In normal circumstances, the backup client agent may not directly access the catalog during restores. In particular, the restore service will query the catalog and gather the version information on behalf of the backup client agent. The restore service can facilitate restores from any catalog in the tenant to any agent. However, the backup client agent also has the ability to restore files directly via the "download" command, although only from its own catalog. This approach permits simple "self-serve" restore operations without intervention by an administrator. Restores can range from downloading a single version of a particular file, to more sophisticated overwrites of entire backup directories to a certain point in time. The backup client agent may also offer some commands to permit the user to view the contents of the catalog. For example, an "info" command lists all versions of a file, and "cd/ls/pwd" commands permit navigation of the catalog data from the command line. In at least some embodiments however, the primary navigation tool for administrators will be a user-friendly browser-based web restore interface.

The backup client agent 850 may also interact with a restore service 310. Among other things, the restore service 310 operates to manage restore jobs. A restore job may be created when a user selects, such as by way of a management console 600 for example, one or more files to be recovered. The restore job thus created is then performed when the backup client agent 850 downloads the identified files from a storage platform, such as the storage platform 400.

An events service 312 of the cloud services 300 may be provided that serves as a permanent history of events that have occurred relating to the operation of the backup client agent 850. The backup client agent 850 can use the events service 312 for, among other things, reporting backup and restore statistics, configuration errors, and any other information relating to the operation of the backup client agent 850. Such information can be reported, for example, to the management console 600 and/or other entities.

Finally, the cloud services 300 may include a log upload service 314. The log upload service 314 can receive and record log files produced by the backup client agent 850. It should be noted that the cloud services 300 disclosed herein are provided only by way of example and additional or alternative cloud services can also be employed.

With continued reference to FIG. 3, details are now provided concerning the example backup client agent 850. As indicated, the backup client agent 850 can include a variety of client libraries 802 by way of which the client 800 interacts with the cloud services 300. The client libraries 802 are interface mechanisms that enable the backup client agent 850 to communicate, on an individual basis, with the various cloud services 300.

As noted earlier, one of the cloud services 300 with which the backup client agent 850 can communicate is the IAM authorization service 302, which provides for an authentication of the backup client agent 850 using a token. Operations at the backup client agent 850 can be handled by a token management module 804. In general, this authentication phase is used to confirm that the backup client agent 850 is allowed to perform backups. More specifically, the authentication phase confirms that client backup client agent 850 is allowed to make calls to the various services needed for performing a backup. For example, the backup client agent 850 cannot make calls to request files, delete files, or other actions without first having been authorized to do so by the IAM authorization service 302.

Thus, the backup client agent 850 must initially issue a call to register for authorization with the IAM authorization service 302. In some embodiments, this process involves passing of a code from the backup client agent 850 to the IAM authorization service 302. In response, the IAM authorization service 302 will provide the backup client agent 850 with a token. That token is then appended to any calls made by the backup client agent 850 to the cloud services 300. In this way, the cloud services 300 are able to verify that the backup client agent 850 is authorized to make the call(s). In contrast with other cloud services 300, the registration process is typically performed at the client 800, rather than being performed centrally at the management console 600.

The backup client agent 850 is configured to operate in conjunction with various policies that can govern, in whole or in part, operations of the backup client agent 850. As indicated in FIG. 3, example elements that can be involved in the definition and/or execution of policies include backup policies 806 that concern backup sets, policies for targets, and scheduling policies. Thus, an example backup policy 806 may contain, among other things, a description of which files to backup, a schedule of when to perform the backups (see, e.g., FIG. 5), and target information that specifies the appliance to which one or more backups is/are to be sent (see, e.g., 502/504 of FIG. 1).

One, some, or all of these policies can be centrally set, such as at a management console 600 for example. In some embodiments, one or more policies can be set locally at the client 800. Some embodiments involve a combination of locally set policies and centrally set policies.

In general, the backup client agent 850 is able to download policies that provide guidance and instructions for parameters relating to backups. Thus, for example, policies can specify what is supposed to be backed up, when the backup(s) should be performed, and which appliance(s) to connect to when the saveset for the backup has been created. This policy information is obtained from the policy service 304. Additional, or alternative, policy information relating to backups can be used.

Advantageously, it is not necessary that an administrator be on/at the client 800 in order to set, modify, configure or access policies. Rather, these functions can be centrally performed for one or more clients, such as at a management console 600 for example. In this way, an administrator can readily configure a plurality of clients from a single management console. This functionality may be particularly useful in an enterprise setting where a large number of clients may be present in diverse locations. As well, the policies implemented by the backup client agent 850 can be automatically supplied to the client 800 based on criteria specified by an administrator. That is, an administrator can specify that one or more particular policies apply to one or more particular clients 800, and those policies can then be pushed out to the policy service 304 for accessing by the backup client agent 850.

In some embodiments at least, policies can be captured in "policy documents." In general, each backup client agent can belong to one or more "groups". This membership is configured by an administrator using the management console and tracked by the IAM services server. Each group has a policy which can be persisted as a JSON document in the policy service. Some example policies include or define a backup policy, a schedule, target and retention. As such, these policies define what client files need to be backed up on the machine and on what frequency. As noted herein, the backup policy can specify, among other things, a list of directories to backup.

The client can download this information on startup and cache it in memory. The client does not need to be aware of the specific details of which group or groups it belongs to because the policy service can determine that based on the client's AgentID. For example, a single call on the policy service returns an array with all the policy documents that apply to it. The client also updates the data periodically so that changes to the policy can reach all the impacted client. And for more immediate results, a command can be issued through the command and control system to force the client to refresh its cached configuration.

As further indicated in the example of FIG. 3, the backup client agent 850 can include a command framework 808 by way of which the backup client agent 850 can receive, and respond to, commands. Some examples of such commands include a command to perform a backup of client 800 data, download data from a storage platform, restore backed up data to the client 800, and return information to one or more of the cloud services 300 concerning a backup and/or restore operation. The commands can also take the form of queries that request information from the backup client agent 850, such as information concerning the progress of a backup operation, or the progress of a restore operation.

Advantageously, at least some of the commands with which the command framework 808 is concerned can originate from a central management console 600, and then be transmitted to the client 800. The command(s) can be received at the client 800 by way of the client libraries 802. That is, the administrator at the management console 600 does not have to connect directly to the client but can, instead, log in to the management console 600, such as by way of a web browser, and then transmit the command(s) to the client 800.

As is apparent from the discussion herein, including the preceding discussion, concerning some example aspects of the functionality and operations of one example client 800 and backup client agent 850, those functions and operations are not being controlled by an entity that is connected to the client 800. Moreover, there is no requirement that such a connection exist in order for those functions and operations to be performed. Rather, the client 800 and backup client agent 850 take direction from a remote entity, such as the management console 600, which can be a cloud based entity. That is, the client 800 and backup client agent 850 can be configured, managed, and controlled by a cloud based entity.

With continued reference now to FIG. 3, the backup client agent 850 may include a job queue 810 that comprises, or consists of, a listing of backup and restore jobs. The listed jobs can appear in any desired order. In some instances, the jobs are listed in chronological order, that is, the job that is to be performed next is at the top of the list, while the job to be performed last is at the bottom of the list. Any other sort order(s) can alternatively be used however. As indicated, a variety of inputs can be implicated by and/or influence the job queue 810. For example, the backup policies 806 can dictate the order that the jobs are to be performed in. As another example, the command framework 808 can direct that a listed job be performed. Additional or alternative inputs can be employed as well. As further indicated, data for a backup job, for example, can be obtained from the local filesystem 870 and/or a local database 875. As well, backup and restore jobs can be stored at the local database 875.

Restore jobs from the job queue 810 can be performed in conjunction with the restore service 310. As noted earlier, the restore service 310 can, among other things, access and download data from cloud storage in response to a call from the backup client agent 850.

Various metrics 812 concerning one or more backup jobs and restore jobs can be collected and stored at the client 800. In general, the metrics 812 can comprise information concerning any aspect of a backup job or a restore job. Such metrics 812, which can include the report of a backup result or a restore result, can be transmitted to the events service 312 by way of the client libraries 802. Moreover, the metrics 812 can include information about the currently active backup or restore and also the history of previously performed backups and restores.

Finally, the backup client agent 850 can include an interface 814 that enables the backup client agent 850 to communicate with an appliance, such as appliance 502 or appliance 504 for example. In at least some embodiments, the interface 814 can take the form of a library that is responsible for file processing and communication with the appliance. Such file processing can include, for example, variable block encoding and patching.

D. Example Backup and Restore Processes

Directing attention now to FIGS. 4-7, details are provided concerning various example backup and restore processes that may be performed in connection with a backup client agent, example embodiments of which are disclosed herein. Before addressing the specific examples disclosed in those figures, some general considerations are provided below. These considerations are provided only by way of example and are not necessarily required in any particular embodiment and are not intended to limit the scope of the invention in any way.

In terms of control functions, and as discussed above in connection with FIG. 3, the backup client agent may be centrally controlled by way of services running in the cloud. Each installation of the backup client agent has a unique "agent id" and the configuration, state and statistics for each agent can be centrally tracked and evaluated, such as by way of a management console. Finally, the backup client agent can be controlled from the cloud via the Command and Control services, such as those discussed elsewhere herein, which invoke commands. Commands can also be invoked via a CLI.

Figure 4:
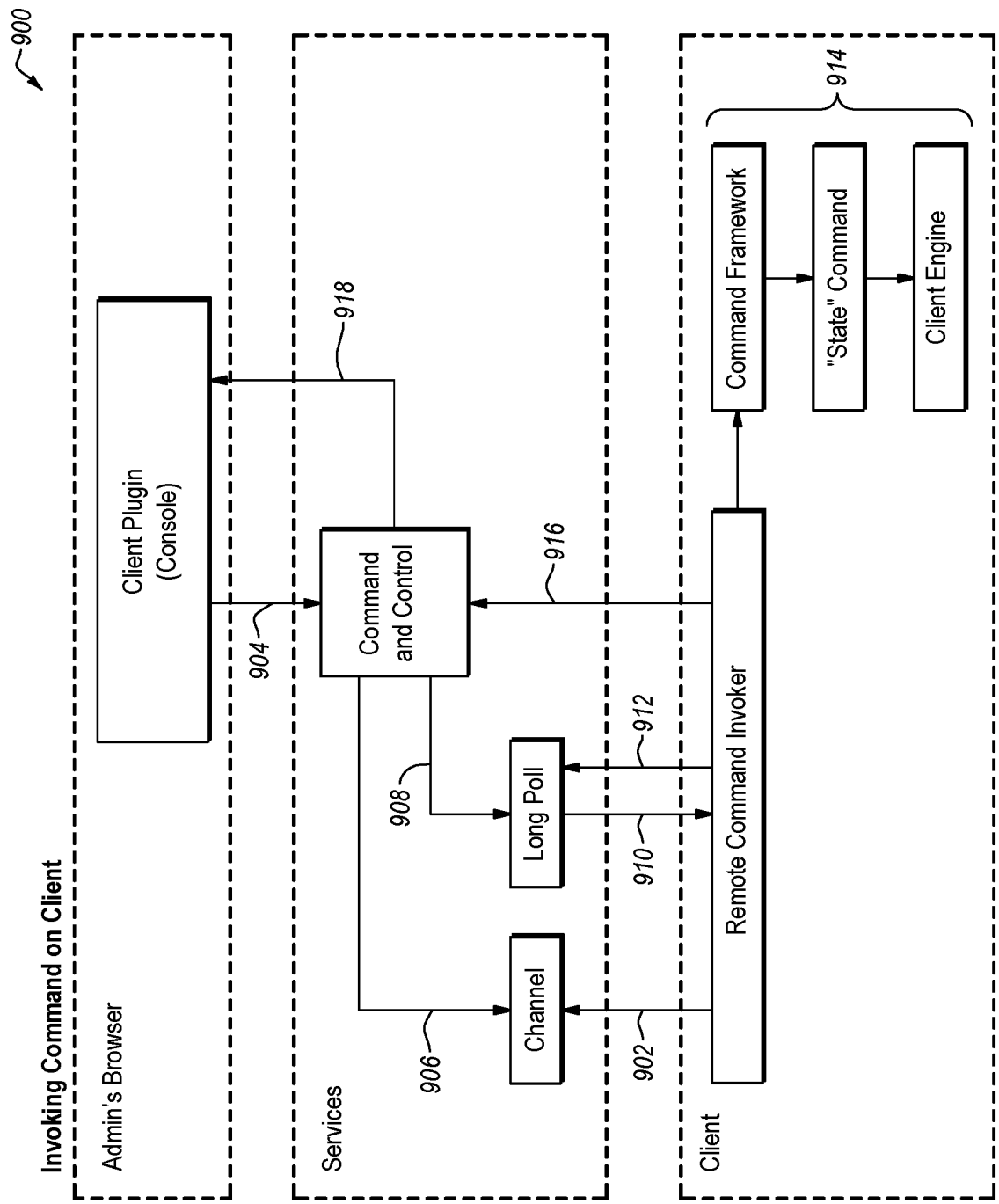
FIG. 4 is directed to an example method for invocation of a command on a backup client agent.

With particular reference now to the example disclosed in FIG. 4, details are provided for a process involving the invocation of a command on a client, where one example of such a process is denoted generally at 900. In the example of FIG. 4, three entities are indicated, namely, a management console, a suite of cloud services, and a backup client agent. Each of the cloud services can be hosted on a respective server, although that is not necessarily required. In this regard it should be noted that while various entities are indicated as performing certain functions, the disclosed functions need not necessarily be allocated as shown and, in other embodiments, the disclosed functions may be allocated differently among the illustrated and/or other entities.

Initially, the backup client agent is online and has registered its own "channel" via the channel service. The client backup agent is holding open a long lasting connection to the Long Poll service waiting for messages. For example, the backup client agent registers 902 using a channel service (see, e.g., 306 of FIG. 3) that enables the backup client agent to register itself for a long polling service. In general, the long polling service offers an HTTP long poll style application program interface (API) for waiting on incoming commands or events. This registration can be initiated by way of a remote command invoker at the backup client agent.

Commands can be triggered based on some action in the management console. In this example, the administrator visits 904 a web page that shows the status of a particular machine. In general, FIG. 4 indicates how the management console can make information requests and control each backup agent. More specifically, FIG. 4 indicates how the management console shows the status of the machine when an administrator visits a web page that has the purpose of showing that status.

The management console plugin then triggers 906 a "state" command in the command and control service targeted at the agent ID of the backup client agent. The command and control service then finds 908 the channel for the requested agent ID and sends a notification via the long polling service to the client.

The client receives 910 the notification as the response to its "poll" call on the long polling service. This document, which can be a JSON document, has information about which command to perform. The client then acknowledges 912 the command so that the notification is removed from the long polling queue.

The command is translated into the native command syntax of the backup client agent and then performed using the command framework. The implementation of the "state" command collects information 914 about the current job queue and other important status information into a JSON document, or other format.

The backup client agent contacts the command and control service to mark 916 the command as finished, and the backup client agent posts the JSON document describing the current state to the command and control service. Finally, the management console retrieves 918 the result of the command it fired, parses the returned JSON and prints out the results.

Figure 5:
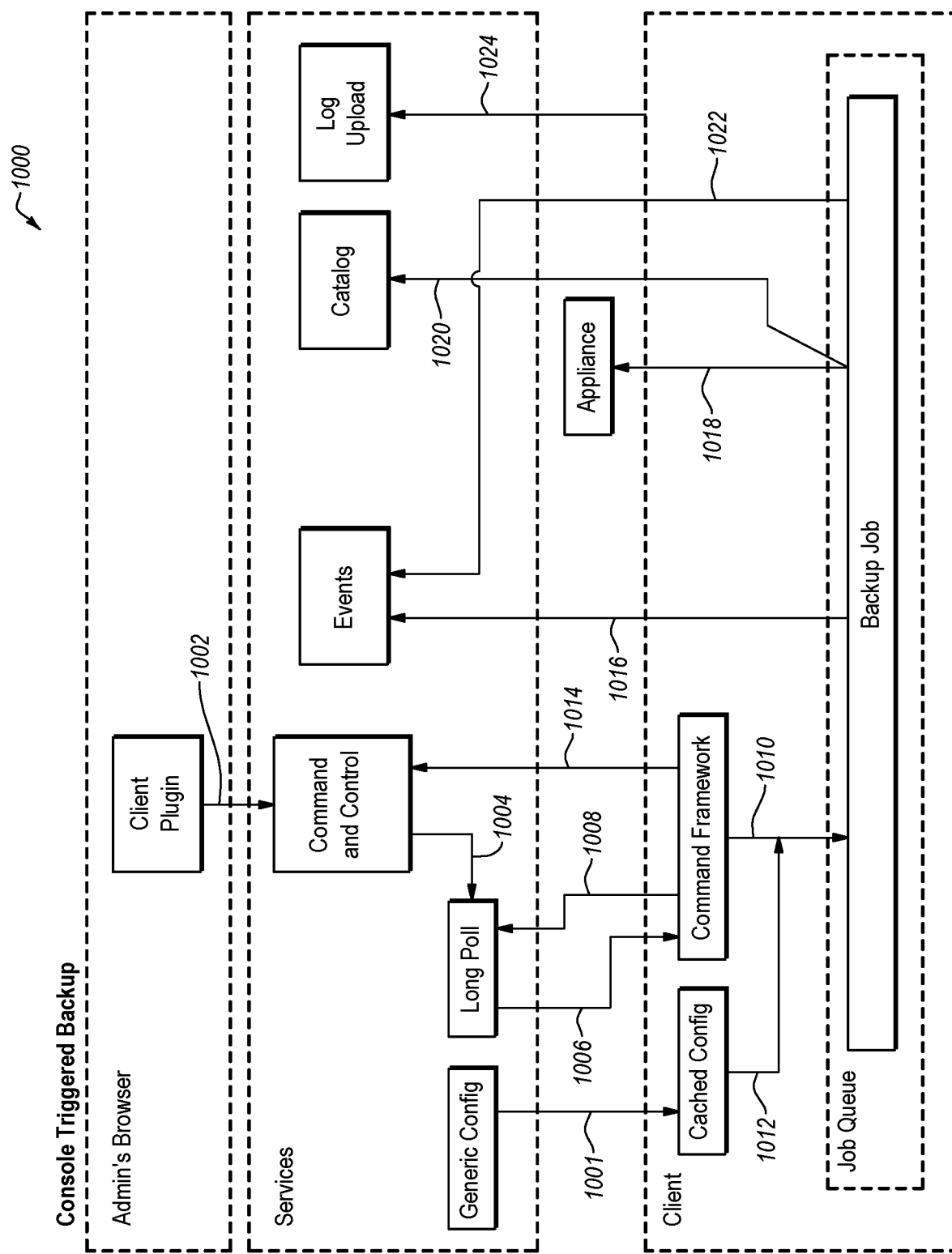
FIG. 5 is directed to an example method for a console triggered backup process performed in connection with a backup client agent.

With reference now to FIG. 5, details are provided concerning a process for triggering, by a management console, performance of a backup by a backup client agent, where one example of such a process is denoted generally at 1000. Initially, the backup client agent can prepare itself by downloading 1001 its configuration from an policy service, and then waiting for any commands using the long polling service. The configuration can be downloaded 1001 to a local cache and may include the backup policy, or backup policies, that apply to the backup client agent. While not specifically indicated in FIG. 5, the backup client agent can report, periodically or on any other basis, to the management console as to the progress of any backup processes, or related processes, performed by the backup client agent and/or performed at the direction of the backup client agent.

When an administrator wants to force an immediate backup, the administrator can trigger the backup 1002 using the management console. The administrator may do this when, for example, a policy has changed and the administrator wants to test immediately rather than waiting for the backup to begin. For example, the management console can create a "start" command targeted to a specific machine, which can be identified by its agent ID. The command and control service then finds the correct channel for the client and contacts 1004 the long polling service The long polling service notifies 1006 the backup client agent with information about the requested command, and the backup client agent examines the request and acknowledges 1008 receipt of the notification back to long polling. The backup client agent then performs 1010 the "start" command. This command gets 1012 the backup policy info from the cached configuration and creates a backup job in the job queue. The backup client agent then contacts 1014 the command and control service to signal that the command is finished. At this stage the command is complete even though the backup has not started, because the command is invoked with the "background" flag. This may be important because the services commands are short-lived and only used to start long running processes, not to actually wait on those processes.

When the job queue is ready to perform the backup job, the backup job is activated and starts executing. This can involve, among other things, creation 1016 by the backup job of a "backup start" event that is posted to the event service. The actual backup is then performed 1018. The file content is written to an appliance, which can take the form of the Mozy CloudBoost or Maginatics appliance for example, and the metadata of the file content is written 1020 to the catalog.

At a successful conclusion of the backup, the statistics are reported 1022 as a "Successful Backup" event. Alternatively if any errors were experienced, a "Failed Backup" event might be created and reported 1022 to the events service. In some embodiments at least, the events service can include a persisted history of all backups, whether successful or unsuccessful, performed by the backup client agent. Finally, the log files associated with the successful or unsuccessful backup are uploaded 1024. The log files can be used later for diagnostics and troubleshooting.

Figure 6:
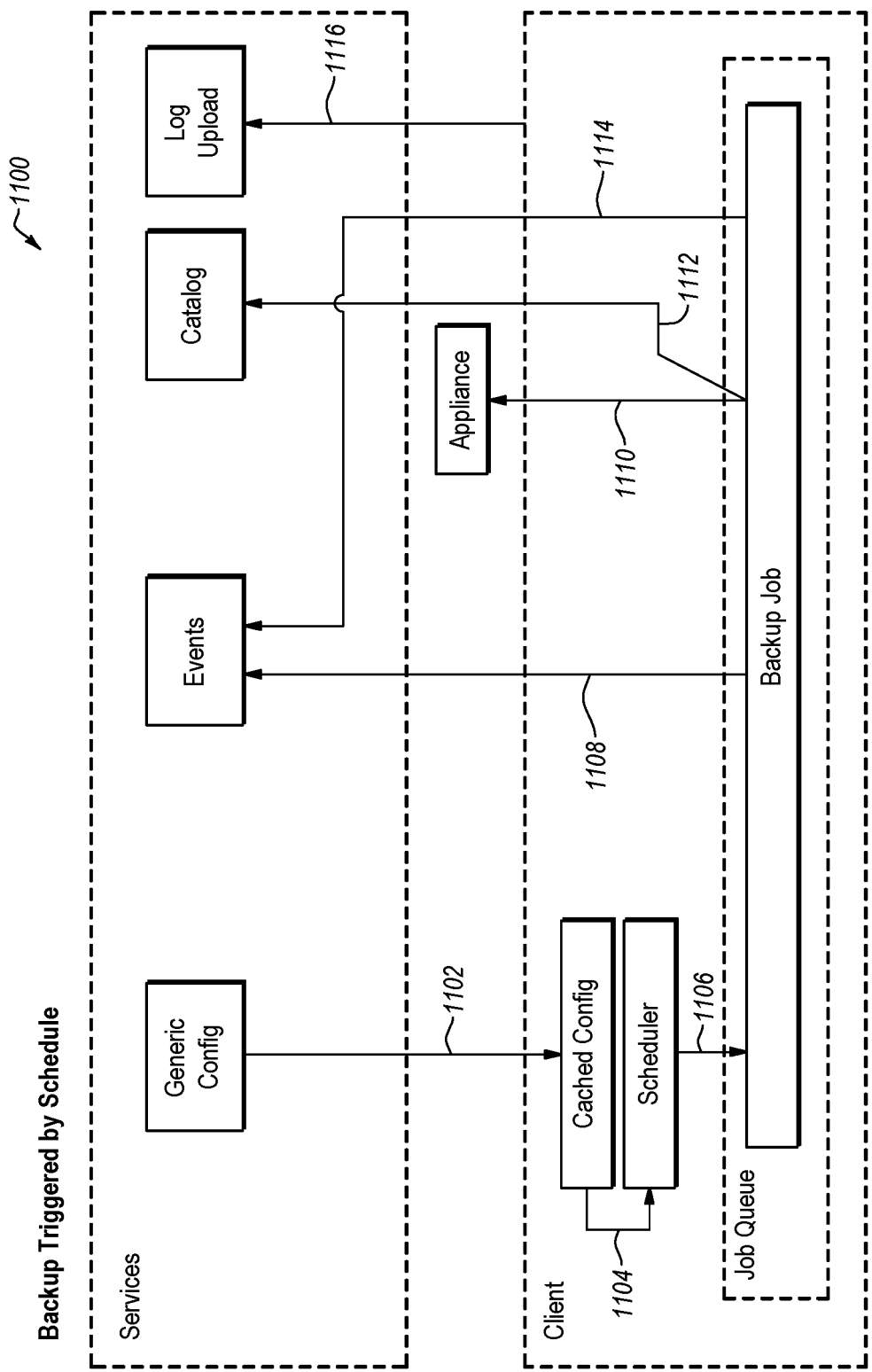
FIG. 6 is directed to an example method for a backup triggered based on a schedule and performed in connection with a backup client agent.

Turning now to FIG. 6, details are provided concerning performance of a backup where initiation of the backup process occurs according to a schedule. In general, such scheduled backups may be largely the same as the "remote triggered" backups that are described above in connection with FIG. 5. Instead of a remote command from a command and control service however, the scheduled backup is triggered based on a local scheduler of the backup client agent. One example of such a process is denoted generally at 1100 in FIG. 6.

Initially, a policy can be downloaded 1102 from a catalog services server to a local cache at the client, and may include the policy, or policies, that apply to the backup client agent. This process may be similar, or identical, to process 1001 of the embodiment of FIG. 5. The policy or policies can be provided 1104 to a scheduler located at the client, and the scheduler then waits for the appointed time, specified in the policy, to begin the backup.

When the appointed time arrives, the backup client agent then performs 1106 the "start" command. This process can be similar to, or the same as, the process 1010 described in the embodiment of FIG. 5. The job queue will make that backup job the active job. This can involve, among other things, creation 1108 by the backup job of a "backup start" event that is posted to the event service. The actual backup is then performed 1110. The file content is written to an appliance, and the metadata of the file content is written 1112 to the catalog. The processes 1108, 1110 and 1112 may be the same as, or similar to, the processes 1016, 1018 and 1020, respectively, of the embodiment disclosed in FIG. 5.

At a successful conclusion of the schedule backup, the statistics are reported 1114 as a "Successful Backup" event. Alternatively if any errors were experienced, a "Failed Backup" event might be created and reported 1114 to the events service. In some embodiments at least, the events service can include a persisted history of all backups, whether successful or unsuccessful, performed by the backup client agent. Finally, the log files associated with the successful or unsuccessful backup are uploaded 1116. The log files can be used later for diagnostics and troubleshooting. The processes 1114 and 1116 may be the same as, or similar to, the processes 1022 and 1024, respectively, of the embodiment disclosed in FIG. 5.

Figure 7:
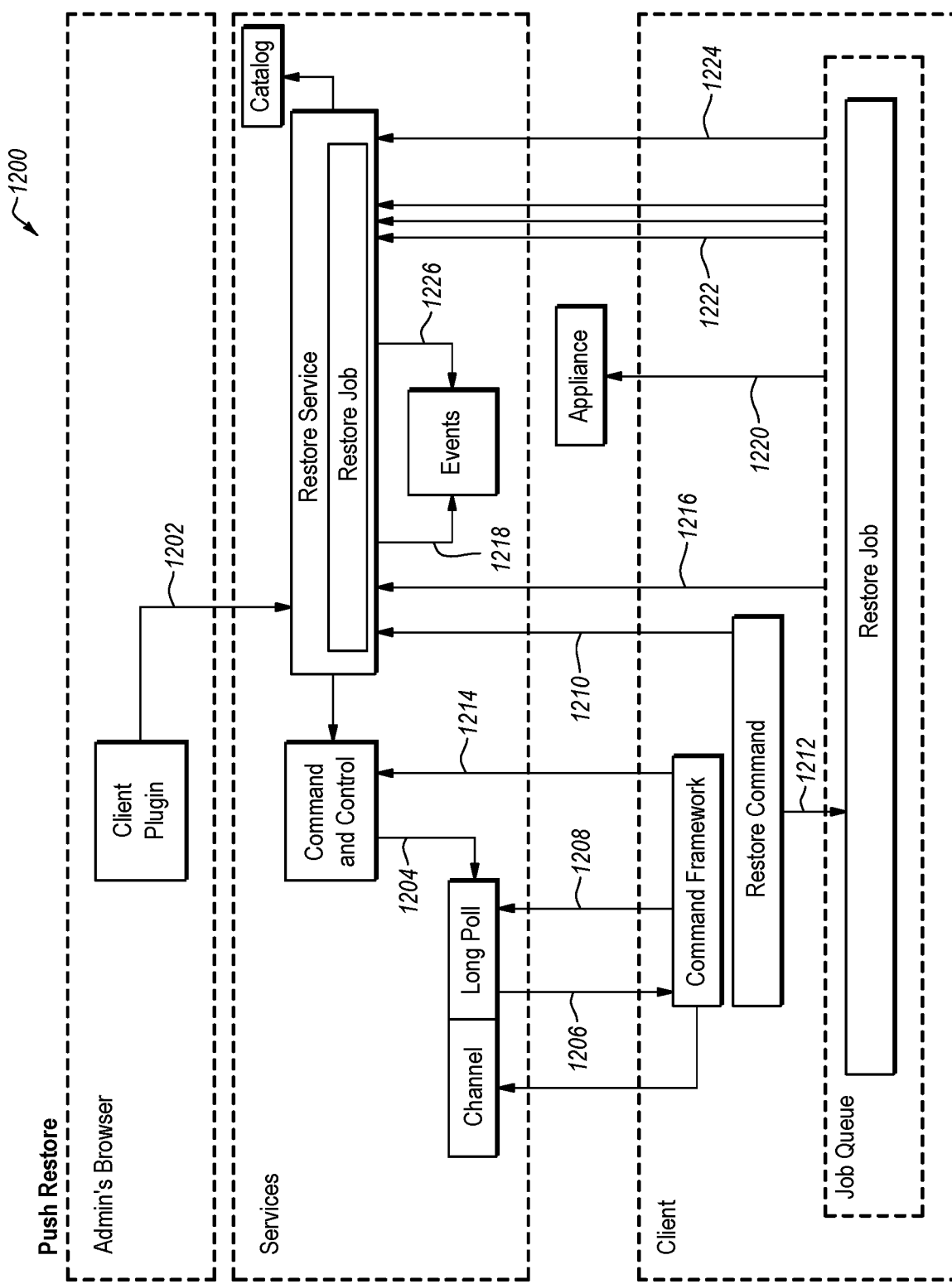
FIG. 7 is directed to an example method for a restore process performed in connection with a backup client agent.

With reference now to FIG. 7, details are provided concerning a restore process performed by a backup client agent, where one example of a restore process is denoted generally at 1200. The process disclosed in FIG. 7 may be referred to as a push restore since the backup client agent does not perform the restore on its own initiative, but rather, on the initiative of the management console.

With particular reference now to FIG. 7, details are provided concerning the process 1200. The backup client agent can register with the channel and long poll services, as described elsewhere herein, before the process 1200 commences, or as part of the process 1200. In any case, an administrator using a browser interface at the management console can browse available files and prepare 1202 a restore job directed to those files. A restore job can be added to the restore service, and a corresponding restore command can be created by the management console and transmitted to the command and control service. The command and control service then finds the correct channel for the client and contacts 1204 the long polling service. The long polling service notifies 1206 the backup client agent with information about the requested command, and the backup client agent examines the request and acknowledges 1208 receipt of the notification back to the long polling service.

The backup client agent then downloads 1210 a restore description to the restore service and performs a "restore" command. This command gets 1212 the restore file information from the restore service and creates a restore job in the job queue. The backup client agent then contacts 1214 the command and control service to signal that the command is finished. At this stage the command is complete even though the restore has not started, because the command is invoked with the "background" flag. This may be important because the services commands are short-lived and only used to start long running processes, not to actually wait on those processes.

When the job queue is ready to perform the restore job, the job queue will make that restore job the active job 1218. This can involve, among other things, creation 1218 by the restore job of a "restore start" event that is posted to the restore service. Next, the files identified by the restore job are downloaded 1220 to the target, which can be an appliance.

As the restore process progresses, status updates can be sent 1222 to the restore service. In some instances, updates can be sent for each file that is downloaded from the target (e.g., the appliance 502/504 of FIG. 3), although that is not necessarily required. Additionally, or alternatively, status updates showing the progress of all the files in the aggregate, rather than an individual basis, can be sent.

When the restore process has been completed, the job queue can report 1224 completion to the restore service. As well, at a successful conclusion of the restore, the statistics are reported to the restore service 1226 as a "Successful Restore" event. Alternatively if any errors were experienced, a "Failed Restore" event might be created and reported 1226 to the restore service.

E. Supplement—Further Example Embodiments

The following portion of this disclosure describes the technical design of the DPC backup client agent that connects to the Maginatics appliance ("Cloud Boost"). This backup client is focused on "Physical" backup from Windows and Linux servers. Another client will handle backups of Virtual Machines (VMBU). This client is designed to run on Linux and Windows machines, with the focus being on "Enterprise Servers," so the project is sometimes called DPC Server.

The new backup offering disclosed here is based on the Maginatics appliance, which acts as a chunk-based deduplication meta-data store and gateway to cloud based storage. The backup offering also relies on new DPC cloud services that replace the existing Mozy servers (e.g. DPC Catalog replaces TMS and BUS is replaced by IAM, Event, Generic Config and other services).

The client, by virtue of using Maginatics, can backup to any of the popular cloud storage services. EMC's "Gouda" service will be the preferred target. The choice of cloud storage is controlled by the DPC console and Maginatics configuration is abstracted away from the client.

The new client will be free of dependencies on Mozy but will reuse client technology where possible. Code that can be reused include libraries for watching file system events, and managing backup sets. The new client will communicate with the new DPC servers. Technology from the Windows backup client will also be reused so that our experience with backing up Windows servers (e.g. running as a Windows service, VSS, monitoring for changes) can be leveraged.

High Level Design Overview—Some Design Concepts

The new client (which may be referred to as 'Rufus') does not communicate with existing Mozy services, and will instead communicate with new DPC services being created from scratch. For example the TMS is replaced by the DPC Catalog.

File processing is done by Maginatics SDK ("magfs") for upload to Maginatics Appliances instead of the client doing its own Variable Block encoding and patching. The new client does less "direct" file processing than the Mozy backup clients.

The same "backupset" feature as Linux Backup will be used. But in the new client, each manual backup is for a single backup set instead of all backup sets.

Backupset definitions are part of the "policy" that is downloaded from the service. Unlike Mozy clients, there is no local configuration supported.

Continuous backup will be replaced by "automatic triggering" of regular manual backups. And only a single backup or restore will happen at a time. This simplifies the main processing logic.

A "SaveSet" is the term for the data created during the execution of a single backup (which corresponds to a single backupset). This replaces the per-file "Storage Time" that was used as a version identifier. The id of the saveset acts as a unique version identifier and all files saved in the saveset will have the same saveset id.

Multiple appliances can be used from a client (these appliances are called "targets" or "locations"). Each backupset will refer to a single "target", so each backup will always write to just a single appliance.

The client is centrally controlled via DPC services running in the cloud. Each installation of the client has a unique "agent id" and the servers track configuration, state and statistics for each agent.

The client can be controlled from the cloud via the Command and Control services which invoke commands. Commands can also be invoked via the CLI. Client code structure and architecture are disclosed in Appendix A, in the diagrams entitled "Rufus Code Structure (high level)" and "Client Architecture" ('Rufus' refers to the client).

Glossary

This glossary focuses on the way that DPC is being used by the physical backup client, so generic terms like "group" are described in the specific way used in this document.

Admin. An administrator is a person who has permissions to access the data inside a tenant, typically via the DPC console.

Agent. An abstract term related to OAuth that refers to a device or software that is part of a tenant. The backup client installed on a specific machine is an agent. The Maginatics appliance is another type of agent.

BackupSet. A definition of a which files should be included in a backup. A backupset typically has a list of directories to recursively backup and rules to exclude certain files.

Catalog. Server that tracks backup meta-data.

Client. The software that runs on the machine that needs to be backed up. The client is installed on Machines, and each installation becomes a unique Agent in the system, so the Client is a type of Agent in DPC.

Cloudboost. Marketing name for the appliance created by Maginatics.

Console. The web interface to DPC, which offers access to configure clients.

CPS. Cloud protection service. Alternative or replacement name to "DPC" for the services created by the DPC team.

DPC. Data protection cloud. Name of a team within EMC and also the cloud based service that they are developing.

Group. In the context of DPC this means a collection of machines that share a policy. A machine can belong to multiple policies.

Location. See 'Target'

Lynx. Code name for the source code used for the Mozy Linux Backup and Mozy Sync clients, a precursor to the Rufus client.

Machine. A computer, typically a customer's server that needs to be backed up. The client is installed on this machine so often used interchangeable with "Client" and "Agent".

Mozy. A team within DPC/EMC and an existing backup service created by the Mozy team prior to the DPC project. In this disclosure, Mozy refers to the technology of that existing system.

Policy. The configuration of the backup client that contains the full instructions for performing backups. This includes the backupset, schedule and target information.

Rufus. Name for physical backup client

SaveSet. The meta-data describing a single backup operation.

Target. A place to put file content. Initially this is a specific cloud boost appliance.

Tenant. A self-contained set of agents, groups, configuration, backup content and other data associated with a specific customer. Data inside a tenant is invisible to other tenants.

Interactions With Other Components

This section discusses how the "engine" of the backup client code interacts with other components and webservices.

Cloudboost Integration Via "MagFS"

The Rufus client uses the MagFS library to do the actual file processing and communication with the appliance. This is a library that exposes a C-style interface that is linked into the client binary. Maginatics also offers a MagFS client which can be used to mount a Maginatics appliance into the local File System as a network share. However in the context of Rufus no file system mounting occurs, instead the client uses the MagFS library to directly connect to the Maginatics appliance via its "raptor" protocol. The client uses wrapper classes to abstract the MagFS API, this is described in a later section.

Overview of DPC Services

In Linux Backup, the client communicates with small group of Mozy services, all of which are very different (BUS client controller, Triton, Auth). In contrast, the Rufus client must communicate with an ever growing list of DPC services (also referred to as "CPS"). The services are all exposed behind a single gateway so that they can be accessed via a single hostname. The current list of services related to the client are the following:

IAM (Identity Access Management)—this handles the database of all agents (including rufus clients), users and other identities. It takes care of authentication (oauth), registration, groups etc.

Catalog—This database records all the versions of files backed up by the client. It stores all the meta-data required to properly browse available backups and to enable their restoration.

Generic Config—This is a repository of JSON documents. The policy documents are storied here.

Agent Config—this service tracks the configuration of Maginatics appliances

Command and Control—This service tracks commands issues to agents or between services. A service can control the client by issuing a command to it.

Long Polling—this service offers a HTTP Long Poll style API for waiting on incoming commands or events Channel—This service facilitates online agents to register themselves for the long polling service.

Events—This service acts as a permanent history of "events" within the system. The client can use it to report backup statistics, configuration errors and other situations that need to be reported to the client.

Restore Service—This service manages restore jobs and enables the push-restore feature. A job is created when the user selects files to recover via the console and then performed when the client downloads those files.

Log Service—This service will receive and record log files produced by the client. Upgrade Service—This service will offer newer versions of the client software.

The other major components outside the client are the CloudBoost Appliances and the Console which is the DPC web interface. The console runs multiple plugins which have the functionality for managing backup agents, managing CloudBoost appliances, restoring files and other tasks. The way the client uses these services to implement its functionality are described in detail in the following sections.

Catalog Integration

The DPC catalog (previously called the "Common catalog") replaces the Mozy TMS (aka Manifest, aka Container). It is a DPC service. Each machine that is backed up will have its own "Catalog." Just as a machine belongs to a particular tenant all the catalogs will belong to a specific tenant. With Mozy, the TDS server acts as a single entry point for both file uploads and meta-data (e.g. it coordinates both TDN and TMS updates behind a single API exposed by TDS). But in the DPC environment, file content is separated from the file meta-data, with the client responsible for writing to two separate services.

When performing a backup file content is written into Maginatics and then the meta-data describing the files is recorded in the catalog. This happens in batches, e.g. the client might write 100 files to Maginatics and then record those 100 files in the catalog, then repeat for the next 100 files, with the process continuing until the backup is finished.

Because catalog can track meta-data on directories, symbolic links, and empty files it will record a more comprehensive view of the data being backed up than what is recorded in Maginatics. Deletions, empty files, directories and symbolic links are written to the DPC catalog as part of a backup or deletion job in addition to the meta-data about non-empty files that have been uploaded to the appliance.

Each file version written into Maginatics and the DPC catalog will reference the "SaveSet ID" of the particular backup that created the version. Information about the SaveSet will be recorded in the catalog. A SaveSet always refers to one single BackupSet and one single Target Maginatics appliance. Most backups are incremental, in which case the saveset only describes new changes since the last backup (e.g. new versions or deletions). The Catalog supports queries that can space savesets.

Initialization of the Catalog

Each client is registered and gets its own unique agent ID. This agent id is used as the "catalog id", so that each agent has a predictable and unique catalog. The catalog is created "on demand" by the client before the first backup operation. The "owner" of the catalog is set to the agentid so that only that agent or an admin can read data from the catalog. The client also sets up a least one Location object describing the specific Maginatics Appliance.

Catalog Access During a Backup

During a backup a SaveSet structure is created, which refers to a specific BackupSet and Location (Maginatics Appliance). The ID of the saveset is generated by the client by incrementing the id of the previous saveset. For efficiency sake versions will be written in batches, so that a single REST API call can record many versions. At the end of the backup the SaveSet is closed so that the catalog server can do post-processing such as calculating the expiry times.

Catalog Access During a Restore

Normally the client may not directly access the catalog during restores. As described elsewhere, the Restore Manager will query the catalog and gather the version information on behalf of the client. The restore manager can facilitate restores from any catalog in the tenant to any agent. But the client also has the ability to restore files directly via the "download" command (but only from its own catalog). This permits simple "self-serve" restore operations without Admin intervention. Restores can range from downloading a single version of a particular file, to more sophisticated overwrites of entire backup directories to a certain point in time.

The client will also offer some commands to permit the user to view the contents of the Catalog, similar to the Mozy Linux Client. E.g. the "info" command lists all versions of a file and the "cd/ls/pwd" commands permit navigation of the catalog data from the command line. However the primary navigation tool for most admins will be a more user-friendly browser-based Web restore interface.

Registration/Authentication

The client will use the Identity and Access Management Service (IAM) to take care of registration and authentication.

Registration is the process of recording the existence of the client in a database.

At registration time the client specifies which tenant it belongs to, probably by use of an invitation code.

Currently as long as the client provides a valid registration code, they are immediately joined as a member of the tenant and optionally assigned to one or more groups. However there is debate about whether a further step of admin approval in the console is a requirement.

Registration assigns an client_id and client_secret to uniquely identify the client installation, these values are returned to the client in response to a successful register call. The client_id is used as the "AgentID" and the client_secret is needed in order to request a token. Both values are persisted (in encrypted form) in the clients local database.

The agent refers to the specific client software running on a specific machine. It is assumed only a single instance of Rufus runs on the same machine so the agent_id to client to machine is a 1 to 1 to 1 relationship.

"Policy" Documents

Each client can belong to one or more "groups". This membership is configured by Admins via the console and tracked by the IAM server. Each group has a policy which is persisted as a JSON document in the Generic Config server. A policy contains a BackupSet, a schedule, target and retention. So these policies define exactly what files need to be backed up on the machine and on what frequency.

The client downloads this information on startup and caches it in memory. The client does not need to be aware of the specific details of which groups it belongs to because the Generic Config service can determine that based on the client's AgentID. A single call on the Generic Config service returns an array with all the policy documents that apply to it.

The client also updates the data periodically so that changes to the policy can reach all the impacted client. And for more immediate results there is a command available that can be issued through the command and control system to force the client to refresh its cached config.

The code for handling Policies is an adapted version of the Mozy Linux Backup Client's backupset library. It has been extended to add support for scheduling, target and a more "backupset-centric" design.

"Remote Control" of the Client

The ability to control the client remotely involves several DPC services, including the Command and Control service, the Long Polling service and the Channel Service. These are part of the EHN ("Event History Notification") system of DPC.

The client natively supports a set of "Commands", based on technology developed for the Mozy Sync and Linux Backup clients. These commands expose functionality of the client much like the command line interface to git or GDB. When running a command line shell on the machine running rufus a user can send commands to the client using the "rufusutil" tool, for example "rufusutil start MyBackup"

The client ('Rufus') includes new functionality so that commands can be triggered via the DPC EHN system but executed by the existing command framework. The diagram disclosed in Appendix A, entitled "Invoking Command on Client", shows the flow.

In more detail:

0. (Initial state) The Client is online and has registered its own "channel" via the channel service. It is holding open a long lasting connection to the Long Poll service waiting for messages.
1. Commands are typically triggered based on some action in the console. In this case the Admin visits a page that shows the status of a particular machine.
2. The console plugin triggers a "state" command in the Command and Control service targetted at the agentid of the client.
3. The command and control service finds the channel for the requested agentid and sends a notification via the longpolling service to the client.
4. The client gets the notification as the response to its "poll" call on the long polling service. This JSON document has information about which command to perform.
5. The client acknowledges the command so that it is removed from the long polling queue.
6. The command is translated into the client's native command syntax and then performed using the command framework. The implementation of the "state" command collects information about the current job queue and other important status information into a JSON document.
7. The client contacts the Command and Control service to mark the command as finished and it posts the JSON document describing the current state to the command.
8. The plugin retrieves the result of the command it fired, parses the returned JSON and prints out the results.

Note: In this example, the command actually returns data base to the caller. Some other commands have no specific return data, apart from success, for example the command to refresh the config. Other commands might return very large datasets, for example a command to list all files in the backup set. The command and control system only permits 4096 bytes of JSON results, so alternative systems will be needed to upload large result sets from the client.

Events

Another component of the EHN system is the Event Service. The client reports "events" to the Event service when certain situations arise in the client. Each time a backup is complete the client will send an event with statistics about the backup. And certain errors like a bad configuration will be reported by an event. Currently the client never queries the event service, but other components can query it when displaying backup history or for Business Intelligence analysis.

Log Upload

The client generates logs as it runs, these files have content similar to those generated by Mozy Linux Backup client. It also has an additional log file generated by MagFS with information specific to the communication with Cloud-Boost. And it is expected to have a special log file listing details about failed backups if a backup fails. All these logs will be uploaded to the Log Server after each backup or restore operation. The logs will also be retained on the client for a period of time and then cleaned up.

Remote Triggered Backups

The previous sections describe some of the important building blocks for implementing "remote" controlled backups. Those are now tied together to show how an actual backup can be triggered from the console.

The backup client supports a "start" command to execute backups. For example "start Docs" command will perform a backup of the files belonging to a backupset called "Docs". And the "start—all" command can be used to execute a sequence of backups, one for each BackupSet. The diagram disclosed in Appendix A, entitled "Console Triggered Backup", shows the flow.

In detail:

0. The client prepares itself by downloading its config and waiting for commands using the Long Polling Service.
   1. When the Admin wants to force an immediate back she can trigger a backup using the DPC Console. For example a Policy might have changed and the Admin wants to test immediately rather than waiting for the backup.
   2. The console creates a "start" command targeted a specific machine (identified by its agentid). The Command and Control service finds the correct channel for the client and contacts the long polling service
   3. The Long Polling service notifies the client with information about the requested command.
   4. The Client examines the request and acknowledges receipt of the notification back to long polling.
   5. The Client performs the "start" command. This command gets the BackupSet info from the cached configuration and creates a Backup Job in the Job Queue. At this stage the command is complete even though the backup has not started, because the command is invoked with the "background" flag. This is important because DPC commands are short-lived and only used to start long running processes, not to actually wait on them.
   6. The client contacts the command and control service to signals that the command is has finished.
   7. When the job queue is ready to perform the backup job it will make it the active job. One of the first things the backup does is to create a "backup start" event that is posted to the Event service.
   8. The actual backup is performed, which is described in more detail in other sections. The file content is written to Cloud Boost and the meta-data is written to the Catalog.
   9. At the end of the backup the statistics are reported as a "Successful Backup" event. Alternatively if any errors were experienced a "Failed Backup" event might be created.
   10. The log files associated with backup are uploaded.

Note: at any time during the backup the console could trigger a "state" command as a way to query the client's current progress through its backupjob.

Push Restore. The diagram disclosed in Appendix A, entitled "Push Restore", shows the flow.

Core Client Technology

The following sections provide more detail about how the backup client is designed and implemented.

Design Pattern for Using DPC Services

One aim of some embofiments is to establish a consistent design pattern in the client code so that the overhead for connecting to so many services can be kept to a minimum.

The following layering approach is provided for each DPC Service:

1. Each DPC service offers its own REST API, exposed on the internet as a Web Service. It is expected that there will be a common gateway exposing all the services at a single URL. Each service will have its own distinct REST API. APIs are defined using the RAML format and stored in the dpc-api-spec git project.

2. The well-respected open source library libcurl is used on the client to communicate via https to the web service.

3. Generated client library Each DPC Service has a RAML file which in turn can be used to generate C++ code for communicating with the service. This generated code handles low level details, like how to invoke a REST API call using curl, what JSON body is expected, what headers to add. It exposes a more C++ friendly set of classes representing the server API and structs representing each JSON structure used in the requests and responses.
   1. The client library code will be generated by running the raml-utils Jenkins job. This invokes a script that lists all the RAMLs that Rufus client requires. The results are then manually checked into Rufus/lib directory (for example/lib/catalogclient)
   2. dpc-api-spec is also used to store definitions of the specific document formats, commands and events that are registered in DPC for use by Rufus. These definitions typically include JSON schemas so that the precise format of the data can be shared between the client and other components.
   3. this layer of generated code could be called the client's 'stub' code
   4. Rufus-specific wrapper layer The client will only use a subset of each DPC service, and it will need code to fit into the client "flows" that can understand the Rufus context and data structures and map those to the correct usage of the generated library. For example, the DPC Catalog may be a generic storage API that does not enforce a lot of schema and data-integrity, so a Rufus-specific wrapper to the DPC Catalog will add a layer of code implementing the specific usage of the DPC Catalog. These classes are located in the rufus/dpcservices directory.
   5. Interface. The Rufus-specific wrapper layer will be encapsulated behind an abstract interface. This is general good practice for large scale C++ development (e.g., to improve compilation speed, reduce code complexity), and this is particularly helpful for testability.
   6. DPC Service Wrapper Mock Implementation Because Unit Tests need to be able to exercise the higher layer code, there is a need to offer "fake" test versions to stand in for each DPC service. One practical way to do this is the implement an alternative implementation of the interface to the service. For example, the "Mock" implementation of the Config interface could read its config from JSON documents in local memory rather than downloading it from the DPC server. The Mock server implementations actually wrap around and exercise the real service wrapper code by generating 'fake' HTTP responses.
   7. Rufus client Engine—the backup "engine" will instantiate the wrapper layer using a factory method and use the abstract interface to make use of the DPC service. Code at this layer will be largely implementing business logic and be protected from much of the inner details. For example it may build a list of file paths and then ask the DPC Catalog wrapper classes to delete those files in the Catalog.

MagFS wrapper layer. The diagram disclosed in Appendix A, entitled "MagFS Code Structuring in Rufus", shows the flow.

For the purpose of code layering and abstraction, the MagFSWrapper projects encapsulates the underlying C SDK and exposes a more Backup specific higher level API called MagStorage.

There are three C++ classes which are thin wrappers over the magfs API. Clients use abstract interfaces (MagFS, MagFSMount and MagFSFile). These classes expose various magfs structures, enumerations and other defines but add a more C++ friendly handling of the functionality (for example MagFSFile object will automatically close the handle when it is destroyed)

One important reason for an abstract interface for the wrapper is because there is a second "Mock" implementation of the same interfaces which is for testing purposes. This mock interface implements the portions of MagFS functionality that are used by the client, but it does not actually talk to the maginatics appliance, nor does it perform any deduplication optimizations. It simply stores files locally in a hierarchy that matches the magfs namespace. This enables running of unit tests of higher layers without being dependent on a CloodBoost appliance and working cloud storage.

The magfs API is pretty low level, for example files are written based by individual writes with a buffer and offset. A higher level class MagStorage uses the MagFS to build higher level operations which help the client perform backups. For example it offers a "writeFile" API to copy an entire local file into magfs.

There are also several helper classes. The MagFSException encapsulates the error codes from Maginatics and context information so that failures in the Maginatics layer can be handled using client exception handling. The MagFSPath class takes care of the specific conversion algorithm for mapping a local path into the Maginatics namespace.

Local Client State (state.dat)

Like lynx, the client uses a local sqlite database to track information about the files that have been backed up to the server.

Major Content:
1. List of all backup sets
2. For each backup set a list of all files and directories that have been backed up, with critical meta-data like the mtime. There is no attempt to store the entire version history of files in the local data, only the most recent version.
3. History of all previous backups including statistics (called the "metrics
4. A table of key/values for persisting information the client All Database Access is Encapsulated Unlike the Lynx database, file "signatures" are not stored because Magfs handles differential sync, so the local DB should be much smaller. However indexing is performed based on the full path of each item so there is some trade-off of space in order to have fast lookups.

Because a single backupset is backed up at each backup operation, the files will be tracked according to backupset. If a file belongs to multiple backupsets, it will be backed up multiple times, which is not costly because of the content deduplication. This approach makes deletion and multi-appliance support work better. See the later section on "Deletion Pass."

Simplified Parallelism

Rather than using multiple fibers, there is a main run loop that performs "engine jobs." This will make it easier to debug and help improve client thread-safety because it will be more clear what might be happening in parallel. To show the difference from Lynx, it is helpful to consider the main threads in the Lynx threading model. The model disclosed in Appendix A, entitled "Lynx Threading Model", shows the flow.

There is only a single UI thread, but it can service parallel commands, timers because it uses an Mordor IOManager to run separate fibers on the same thread. With only one thread, then only one fiber executes at a time. A fiber is not preempted by the OS, but it will voluntarily yield at times that it performs IO or other similar calls inside the Mordor library. So if a single commands starts a number of CPU bound calculations, the rest of the application would be starved out.

There are two schedulers inside the sync engine—the main iomanager with two threads and a workerpool with two more threads. Nearly everything can run through the main two iomanager threads, because timers and async IO on files and sockets make use of the IOManager for fiber based execution. Some work gets dumped onto the Worker threads.

One example threading model is disclosed in Appendix A, entitled "Rufus Threading Model".

Rather than a single App thread, it is understood that multiple commands might be executed at a time, so a thread per mozyutil connection may be usefully implemented. The thread count can be fixed (e.g., at 3), although that is not required. Any additional commands that connect will have to wait for an available thread. Because the rest of the code is avoiding Mordor code, those threads can be treated like regular non-fiber threads because the main fiber won't "yield" until the command has finished execution.

At least some embodiments employ a single "Job Thread" that executes one "Engine Job" at a time. These jobs will be high level instructions like "backup of backupset A", "check for upgrades," "push download restore of X, Y, Z". The thread-safety design may simpler when only a single one of these can execute at a time. Jobs are added to a queue from the Application Threads or from a scheduling server using a multi-producer/single-consumer model.

Although all jobs can execute in a single thread, there is a need to make the engine and many of its components highly thread safe. That is because commands to query information or enqueue new jobs can execute in parallel from any of the Application's layer command threads. Standard boost/stl synchronization primitives like mutex, condition variables, thread::join can be used.

Another aspect of some embodiments is the concept of blocking on a job. When invoking a backup from a command line, it is useful to get feedback of the progress of that backup on the command line as it executes and for the command to stop only when the backup has completed. This is how the "download" and "activate" command works in Lynx, but the backup functionality was geared towards "continuous mode" and is always asynchronous. With the client ('Rufus'), both synchronous and asynchronous models of performing a job are supported.

To do a job synchronously the following processes may be emp;loyed:
1. The Application layer command thread calls an API in the engine to create a job
2. The "ostream" of the command is connected to the job so that the job can stream progress reports as it runs
3. The job is put into the queue
4. The Application layer calls EngineJob::waitOnCompletion( ) to block
5. The JobThread processes its queue, which may involve completing other jobs before it reaches the new job 6. When the job executes it writes progress to the ostream
7. After the job is complete it notifies the threads blocked on EngineJob::waitOnCompletion
8. The Application layer command thread wakes up and finish the command execution, then goes to sleep waiting for the next command invocation.

The asynchronous model will be useful for scheduled and remotely invoked tasks, where there is no interactive user interested in watching the progress of that job. To do a job asynchronously, the following processes may be employed:
1. The invoking client calls an API in the engine to create a job
2. There is no ostream installed for progress
3. The job is added into the queue and the invoking client continues execution to do whatever else it wants
4. The JobThread processes its queue, which may involve completing other jobs before it reaches the new job
5. When the job executes no progress is reported (although it can write into the regular application log)

This engine job thread does not exclude the possibility of additional multi-threading. Actual jobs may well delegate work to other threads. For example, it can be expected that uploads will be performed with parallel batches running on a pool of send threads.

Changes to App State

In the Sync client, the concept of "App State" is a convenient way to track the steps as a client started up, was running synchronization or was paused/shutting down. For Linux client, this concept, in various scenarios, may not have been a helpful way to try to track what situation the client was in. Thus, for the Rufus client, this concept is being simplified and downplayed. For example, there is no central enum listing all the possible states. Rather, there are several different situations tracked at different layers of the software and reported as part of the output of the "state" command.

A client that is not yet registered is basically "uninitialized", it is simply running with minimal resource usage waiting for the "register" command. Once registered, it is a command to be executed. Tracking can also be performed to determine whether the client is connect or disconnected to DPC. If the client has successfully activated in the past but is not able to connect to long polling service, the client will be considered in "DISCONNECTED" state. By its very nature, this state cannot be actively reported to DPC, but it will be recorded in the local log and could potentially be tracked by the long polling service.

Replacing Full Sync Algorithm

The purpose of Full Sync is to force a "full" backup rather than attempting an incremental. In a Linux backup client, this is a special sync algorithm that flushes the local database and then performs a special two way comparison between the local file system and the catalog.

The Rufus client performs well if the local database is erased because cloud boost handles deduplication efficiently. But if there is a need to implement full sync, a two phase approach can be employed. Part one: Flush the local database. Query the catalog to rebuild the database by querying latest version of each file/directory in each backup set. Metrics may also be rebuilt. Part two: perform a normal backup. It will do an incremental backup because the database has been pre-populated with info about what is available on the server.

Policy Format

The format for a policy is an evolution of the Linux backup client's backup set format. Give that each group has a single policy and each policy has a single backup set the name for the policy/group and backupset should all match the group name. The current code expects multiple backupsets to be defined in an array called "backupsets". This may change to an array called "groups" or some other simple high level JSON structuring. The definition of the which files to backup is exactly the same as the Linux backup format.

| Property | Description |
| --- | --- |
| name | Name of the backup set (recommend that it is equivalent to the group and policy name) |
| paths | Array of paths to backup (absolute paths) |
| excludes | Array of paths that should be pruned from the backup |
| exclusionary (bool) | When true this means that the backup |
| rules { filenames } | Array of filename patterns to include in the backup. * wildcard is supported |
| rules { exclude_filenames } | Opposite of filenames. Any files matching the list of file patterns is removed from the backup |
| rules { filetypes } | Array of file extensions. Only files matching these extensions will be backed up. * wildcard is supported |
| rules { exclude_filetypes } | Array of file extensions which should not be included in the backup |

Details are in rufus\backupsets\backupset.cpp and backupset_rule.cpp. Also refer to [linclient:LinuxBackupSet] for full details of the original design and its evolution. Retention may also be described.

The policy also adds the follow new concepts:

| target | A JSon object with fields that specify which Cloudboost appliance to backup to. |
| --- | --- |
| days, starts, frequency | Describe the schedule for the backup, documented elsewhere | considered "Activated" and can actually connect to DPC. Once activated, the client might be performing a job or it might have an empty queue. If the queue is empty, then it is "IDLE", e.g. it is just waiting for the next scheduled job or Individual Schedules for Backup Sets As mentioned in the section concerning parallelism, the engine will process a queue of jobs. A "Backup Job" is always the backup of only a single backup set. These jobs can be scheduled based on configuration downloaded from DPC services or triggered manually. In one version, the scheduling logic may be relatively simple. Two types of schedules are permitted.

Schedule Type 1: By frequency—Backup is repeated every X minutes. Backup "MyBackup" every 2 hours

```
{
name: "MyDocBackup",
frequency : 180
}
```

The Frequency is in minutes. By default, the minimum frequency is hourly (60) but this can be adjusted by changing the config var rufus.backupfrequencymin.

Schedule Type 2: By calendar, each once a day at a certain time on certain days of the week. Backup "MyMusicBackup" at 1:15 PM on Fridays

```
{
name : "MyMusicBackup",
starts : "13:15"
days : 2
}
```

The days field is a bit field of the week days. For example, tTo backup up on multiple days of the week, the value for each day is added together.

1. Saturday=1
2. Friday=2
3. Thursday=4
4. Wednesday=8
5. Tuesday=16
6. Monday=32
7. Sunday=64

For example, 65 means Saturday and Sunday. The "starts" time is the local time in 24 hour format. E.g. 14:25 is the same as 2:25 PM. The backup engine will check the scheduler several times each minute to see if any backup job is ready to execute according to its schedule.

Flow for Scheduled Backup. The diagram in Appendix A, entitled "Backup Triggered by Schedule", shows the flow.

Scheduled backups are largely the same as the "remote triggered" backups that are described in an earlier section. But instead of a remote command from command and control, the schedule is triggered based on its local scheduler.

Changes to Deletion Pass

There may be a need to delete files on the server that don't match the current backup set definitions any more. In Lynx, this is done by marking all files in the snapshot as a full local scan is performed. Any files or directories that are not marked at the end of the full scan, have either been deleted or have fallen out of the local backup definition.

For the client ('Rufus'), the process may be more complicated, because only individual backup sets are backed up, rather than performing complete backup calculations across all backupsets. A single file may belong to multiple backupsets.

In one implementation, a more sophisticated schema is used that tracked membership of a file in each backupset and deleted files when membership count dropped to zero. Another embodiment involves a backupset-centric design, where each version belongs to only a single backup set even if there is overlap. This makes deletion easier to calculate with a simpler schema. When performing a backup, only the version table associated with that backup set needs to be considered and there is no reference counting.

So if a policy is removed (e.g. if a client is removed from a group via the console) then there is a need to detect this disappearance. This calculation runs before each regular "backup". The engine will compare the known list of backupsets (stored in the local state.dat) with the current list. If a backupset has disappeared, then a special job to delete all contents of that backupset will be invoked. It simply upload deletions for all files listed in the local database's version table for that backup set.

Development Unit Testing

Unit tests can be created and maintained by developers along with features and bug fixing. This can be important to maintain code quality in a cross platform software project. In order to avoid dependency problems with external services the client will require fake implementations of the servers that can run locally. These "Mock" servers will be greatly simplified alternatives to the real services but should react identically in the specific scenarios required for unit testing. For example, the Mock Magfs implementation will store files locally without any attempt to de-duplicate content because chunk based deduplication is entirely transparent to the client code that uses magfs.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods, or portions thereof, disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, and on-premises storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions, examples of which include the functions disclosed herein. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, switch, server, database, or storage node may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   tracking, by a command and control service running in a cloud computing environment, commands issued to a backup client agent by other services running in the cloud computing environment and commands issued between the other services;
   receiving, by a cloud service running in the cloud computing environment, a register call for authorization to access one or more of the other services, wherein the register call is received from the backup client agent and includes a registration code, and the register call is responsive to a 'register' command in the tracked commands issued to the backup client agent;
   in response to the register call from the backup client agent, registering, by the cloud service, the backup client agent, wherein the registering is performed at a client that hosts the backup client agent, and the registering includes returning, to the client, a client identifier and a client secret that uniquely identify the client;
   implementing, by the cloud service, an authentication process, and the authentication process includes evaluating the registration code, and the backup client agent is not permitted to make calls to other cloud services until the backup client agent has been authenticated by the cloud service, wherein:
   when the backup client agent is not authenticated, preventing access by the backup client agent to one or more of the other cloud services; or
   when the backup client agent is authenticated, transmitting a token to the backup client agent; and
   one or both of a backup process and a restore process, performed by the backup client agent after the backup client agent has been authenticated, are controlled by a management console running in the cloud computing environment.

2. The method as recited in claim 1, wherein when the backup client agent is authenticated, the backup client agent is allowed to perform backups.

3. The method as recited in claim 1, wherein when the backup client agent is authenticated, one or more of the other cloud services is responsive to service calls issued to it by the backup client agent.

4. The method as recited in claim 1, further comprising configuring, by the management console, the backup client agent and a client that hosts the backup client agent.

5. The method as recited in claim 1, wherein the management console tracks a configuration, a state, and statistics, of the backup client agent.

6. The method as recited in claim 1, where the one or more other cloud services comprise any one or more of a policy service; a command and control service; a catalog; a restore service; an events service; and, a log upload service.

7. The method as recited in claim 1, further comprising issuing, by one of the other cloud services, one or more commands to the backup client agent.

8. The method as recited in claim 1, further comprising controlling, by one of the other cloud services, one or more operations of the backup client agent.

9. The method as recited in claim 1, further comprising issuing, by one of the other cloud services, a backup command to the backup client agent.

10. The method as recited in claim 1, further comprising issuing, by one of the other cloud services, a restore command to the backup client agent.

11. A non-transitory storage medium having stored therein instructions that are executable by one or more hardware processors to perform operations comprising:
    tracking, by a command and control service running in a cloud computing environment, commands issued to a backup client agent by other services running in the cloud computing environment, and commands issued between the other services;
    receiving, by a cloud service running in the cloud computing environment, a register call for authorization to access one or more of the other cloud services, wherein the register call is received from the backup client agent and includes a registration code, and the register call is responsive to a 'register' command in the tracked commands issued to the backup client agent;
    in response to the register call from the backup client agent, registering, by the cloud service, the backup client agent, wherein the registering is performed at a client that hosts the backup client agent, and the registering includes returning, to the client, a client identifier and a client secret that uniquely identify the client;
    implementing, by the cloud service, an authentication process, and the authentication process includes evaluating the registration code, and the backup client agent is not permitted to make calls to other cloud services until the backup client agent has been authenticated by the cloud service, wherein:
    when the backup client agent is not authenticated, preventing access by the backup client agent to one or more of the other cloud services; or when the backup client agent is authenticated, transmitting a token to the backup client agent; and one or both of a backup process and a restore process, performed by the backup client agent after the backup client agent has been authenticated, are controlled by a management console running in the cloud computing environment.

12. The non-transitory storage medium as recited in claim 11, wherein when the backup client agent is authenticated, the backup client agent is allowed to perform backups.

13. The non-transitory storage medium as recited in claim 11, wherein when the backup client agent is authenticated, one or more of the other cloud services is responsive to service calls issued to it by the backup client agent.

14. The non-transitory storage medium as recited in claim 11, further comprising configuring, by the management console, the backup client agent and a client that hosts the backup client agent.

15. The non-transitory storage medium as recited in claim 11, wherein the management console tracks a configuration, a state, and statistics, of the backup client agent.

16. The non-transitory storage medium as recited in claim 11, where the one or more other cloud services comprise any one or more of a policy service; a command and control service; a catalog; a restore service; an events service; and, a log upload service.

17. The non-transitory storage medium as recited in claim 11, wherein the operations further comprise issuing, by one of the other cloud services, one or more commands to the backup client agent.

18. The non-transitory storage medium as recited in claim 11, wherein the operations further comprise controlling, by one of the other cloud services, one or more operations of the backup client agent.

19. The non-transitory storage medium as recited in claim 11, wherein the operations further comprise issuing, by one of the other cloud services, a backup command to the backup client agent.

20. The non-transitory storage medium as recited in claim 11, wherein the operations further comprise issuing, by one of the other cloud services, a restore command to the backup client agent.

* * * * *